US011979775B2

(12) United States Patent
Hodoshima (10) Patent No.: US 11,979,775 B2
(45) Date of Patent: May 7, 2024

(54) COMMUNICATION SYSTEM, ACCESS POINT, WIRELESS LAN TERMINAL, COMMUNICATION CONTROL METHOD, AND NON-TRANSITORY COMPUTER READABLE MEDIUM (71) Applicant: NEC Platforms, Ltd., Kawasaki (JP)

(72) Inventor: Takeshi Hodoshima, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 289 days.

(21) Appl. No.: 17/298,816

(22) PCT Filed: Oct. 15, 2019

(86) PCT No.: PCT/JP2019/040507
§ 371 (c)(1),
(2) Date: Jun. 1, 2021

(87) PCT Pub. No.: WO2020/121642
PCT Pub. Date: Jun. 18, 2020

(65) Prior Publication Data
US 2022/0038958 A1 Feb. 3, 2022

(30) Foreign Application Priority Data
Dec. 12, 2018 (JP) .................. 2018-232473

(51) Int. Cl.
*H04W 28/22* (2009.01)
*H04W 8/12* (2009.01)
(Continued)

(52) U.S. Cl.
CPC ............ *H04W 28/22* (2013.01); *H04W 8/12* (2013.01); *H04W 48/20* (2013.01); *H04W 76/18* (2018.02); *H04W 84/12* (2013.01)

(58) Field of Classification Search
CPC .................................................... H04W 28/22
See application file for complete search history.

(56) References Cited

U.S. PATENT DOCUMENTS

| 2005/0237934 | A1* | 10/2005 | Mito | ..................... | H04L 1/0003 370/232 |
| 2015/0005016 | A1* | 1/2015 | Palanki | ................. | H04W 4/027 455/456.6 |

(Continued)

FOREIGN PATENT DOCUMENTS

| JP | 2003110578 A | 4/2003 |
| JP | 2005286642 A | 10/2005 |

(Continued)

OTHER PUBLICATIONS

International Search Report of PCT Application No. PCT/JP2019/040507 dated Dec. 17, 2019.

*Primary Examiner* — Jason E Mattis (57) ABSTRACT

The present disclosure provides a communication system that prevents a wireless LAN terminal fixedly installed from performing roaming. A communication system (1) includes: a wireless LAN terminal (10) that transmits first information indicating whether or not the wireless LAN terminal is a fixed station fixedly installed; and an access point (20) that selects, when the first information indicates that the wireless LAN terminal is the fixed station, communication rates including a maximum communication rate and a minimum communication rate from among a plurality of communication rates that can be set in communication with the wireless LAN terminal (10) and transmit second information about the selected communication rates to the wireless LAN terminal (10). The wireless LAN terminal (10) attempts communication based on the communication rates included in the second information.

7 Claims, 7 Drawing Sheets (51) Int. Cl.
*H04W 48/20* (2009.01)
*H04W 76/18* (2018.01)
*H04W 84/12* (2009.01)

(56) References Cited

U.S. PATENT DOCUMENTS

2016/0113045 A1* 4/2016 Kang .................... H04L 67/141
 370/338
2016/0366702 A1* 12/2016 Baba ..................... H04L 12/413
2017/0135145 A1 5/2017 Amini et al.

FOREIGN PATENT DOCUMENTS

| | | |
|---|---|---|
| JP | 2006217110 A | 8/2006 |
| JP | 2016174303 A | 9/2016 |
| JP | 2016213568 A | 12/2016 |

* cited by examiner

COMMUNICATION SYSTEM, ACCESS POINT, WIRELESS LAN TERMINAL, COMMUNICATION CONTROL METHOD, AND NON-TRANSITORY COMPUTER READABLE MEDIUM

This application is a National Stage Entry of PCT/JP2019/040507 filed on Oct. 15, 2019, which claims priority from Japanese Patent Application 2018-232473 filed on Dec. 12, 2018, the contents of all of which are incorporated herein by reference, in their entirety.

TECHNICAL FIELD

The present disclosure relates to a communication system, an access point, a wireless LAN terminal, a communication control method, and a communication control program.

BACKGROUND ART

In a wireless LAN communication system, an access point and a wireless LAN (Local Area Network) terminal have a function of switching a communication rate, which is called multi-rate control, and a technology related to multi-rate control is known (e.g., Patent Literature 1).

Patent Literature 1 discloses that the maximum transmission rate and the minimum transmission rate that can be used by a wireless LAN terminal are set based on the transmission/reception rate when the link between an access point and the wireless LAN terminal is established.

CITATION LIST

Patent Literature

Patent Literature 1: Japanese Unexamined Patent Application Publication No. 2005-286642

SUMMARY OF INVENTION

Technical Problem

Incidentally, when a wireless LAN terminal can no longer communicate with an access point to which the wireless LAN terminal is currently connected, the wireless LAN terminal performs roaming for performing reconnection from the access point to another access point. When the wireless LAN terminal performs roaming, the wireless LAN terminal determines whether or not to perform roaming on the wireless LAN terminal side based on a radio wave intensity and a communication retry status, and performs roaming if a result of the determination meets these above conditions for performing roaming.

It should be noted that, in regard to a wireless LAN terminal, there is a terminal used as a fixed station that is fixedly installed. The wireless LAN terminal that is fixedly installed is preferably always connected to the same access point, such as the access point closest to this wireless LAN terminal. That is, it is preferable to prevent the wireless LAN terminal that is fixedly installed from performing roaming.

However, upon consideration of the system configuration of the entire wireless LAN network, the wireless LAN terminal that is installed at a fixed location and used may perform unintended roaming. This is because the radio wave intensity and the communication retry cannot be controlled by the access point and thus the expected roaming control cannot be performed. That is, in some cases, it is not possible to prevent the wireless LAN terminal that is fixedly installed from performing roaming.

The present disclosure has been made in order to solve the aforementioned problem and an object thereof is to provide a communication system, an access point, a wireless LAN terminal, a communication control method, and a communication control program that are capable of preventing a wireless LAN terminal that is fixedly installed from performing roaming.

Solution to Problem

A communication system according to the present disclosure includes:
 a wireless LAN terminal configured to transmit first information indicating whether or not the wireless LAN terminal is a fixed station that is fixedly installed; and
 an access point configured to select, when the first information indicates that the wireless LAN terminal is the fixed station, communication rates including a maximum communication rate and a minimum communication rate from among a plurality of communication rates that can be set in communication with the wireless LAN terminal and transmit second information about the selected communication rates to the wireless LAN terminal,
 in which the wireless LAN terminal attempts communication based on the communication rates included in the second information.

An access point according to the present disclosure includes:
 a communication unit configured to receive, from a wireless LAN terminal, first information indicating whether or not the wireless LAN terminal is a fixed station that is fixedly installed; and
 a selection unit configured to select, when the first information indicates that the wireless LAN terminal is the fixed station, communication rates including a maximum communication rate and a minimum communication rate from among a plurality of communication rates that can be set in communication with the wireless LAN terminal,
 in which the communication unit transmits second information about the selected communication rates to the wireless LAN terminal.

A wireless LAN terminal according to the present disclosure includes:
 a communication unit configured to transmit, to an access point, first information indicating whether or not the wireless LAN terminal is a fixed station that is fixedly installed and receive, from the access point, second information about communication rates used for communication with the access point; and
 a communication control unit configured to attempt communication based on the communication rates included in the second information.

A communication control method according to the present disclosure includes:
 receiving, from a wireless LAN terminal, first information indicating whether or not the wireless LAN terminal is a fixed station that is fixedly installed;
 selecting, when the first information indicates that the wireless LAN terminal is the fixed station, communication rates including a maximum communication rate and a minimum communication rate from among a plurality of communication rates that can be set in communication with the wireless LAN terminal; and transmitting second information about the selected communication rates to the wireless LAN terminal.

A communication control program according to the present disclosure causes a computer to:

receive, from a wireless LAN terminal, first information indicating whether or not the wireless LAN terminal is a fixed station that is fixedly installed;

select, when the first information indicates that the wireless LAN terminal is the fixed station, communication rates including a maximum communication rate and a minimum communication rate from among a plurality of communication rates that can be set in communication with the wireless LAN terminal; and transmit second information about the selected communication rates to the wireless LAN terminal.

Advantageous Effects of Invention

According to the present disclosure, it is possible to provide a communication system, an access point, a wireless LAN terminal, a communication control method, and a communication control program that are capable of preventing a wireless LAN terminal that is fixedly installed from performing roaming.

DESCRIPTION OF EMBODIMENTS

Hereinafter, example embodiments of the present disclosure will be described with reference to the drawings. Note that, in order to clarify the explanation, the following descriptions and the drawings are partially omitted and simplified as appropriate. Further, the same symbols are assigned to the same elements throughout the drawings, and redundant descriptions are omitted as necessary.

First Example Embodiment

Figure 1:
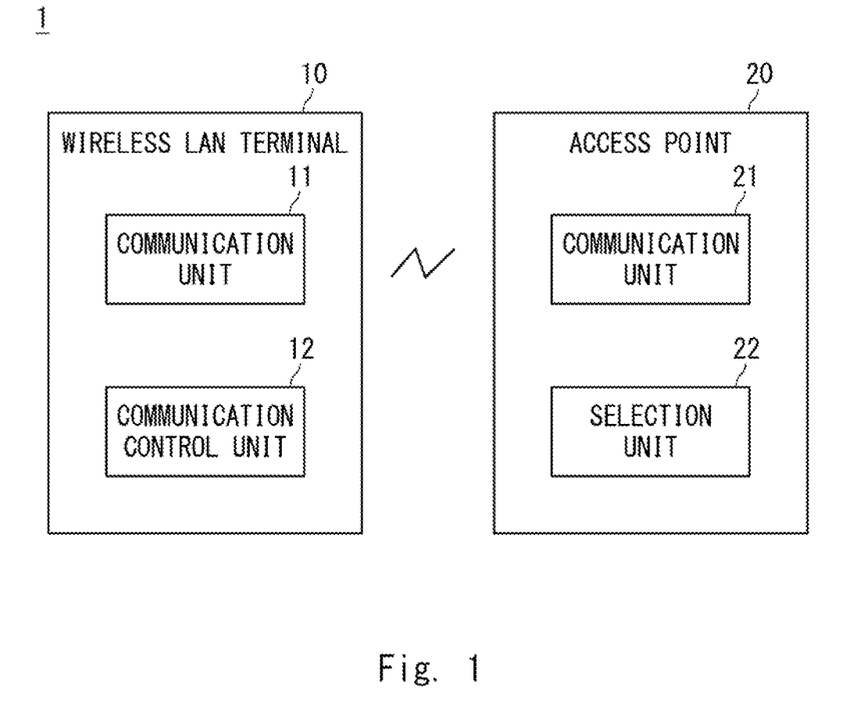
FIG. 1 is a diagram showing a configuration example of a communication system according to a first example embodiment.

A first example embodiment will be described with reference to FIG. 1. FIG. 1 is a diagram showing a configuration example of a communication system according to the first example embodiment. A communication system 1 is a wireless LAN communication system. The communication system 1 includes a wireless LAN terminal 10 and an Access Point (AP) 20.

The wireless LAN terminal 10 performs processing (processing for making the wireless LAN terminal 10 belong to the access point 20) for connecting to the access point 20 and then performs radio communication with the access point 20. The wireless LAN terminal 10 may be referred to as a wireless slave station using the access point 20 as a wireless master unit, or may instead be referred to as a Client (CL).

The wireless LAN terminal 10 includes a communication unit 11 and a communication control unit 12.

The communication unit 11 transmits, to the access point 20, first information indicating whether or not the wireless LAN terminal 10 is a fixed station that is fixedly installed. Further, the communication unit 11 receives, from the access point 20, second information about a communication rate used for communication with the access point 20.

The first information includes information indicating that the wireless LAN terminal 10 is a fixed station that is fixedly installed. The first information may include information indicating that the wireless LAN terminal 10 is a mobile station, which is a terminal that is moved and used or a terminal that will be moved and used. In other words, when the first information indicates that the wireless LAN terminal 10 is a mobile station, the first information indicates that the wireless LAN terminal 10 is not a fixed station.

The second information is information about communication rates used in communication between the wireless LAN terminal 10 and the access point 20 among a plurality of communication rates that can be set by the wireless LAN terminal 10 and the access point 20. The communication rates that can be set may be communication rates that can be supported by both the wireless LAN terminal 10 and the access point 20.

The communication control unit 12 attempts to communicate with the access point 20 based on the communication rates included in the second information.

The access point 20 includes a communication unit 21 and a selection unit 22.

The communication unit 21 receives the first information from the wireless LAN terminal 10 and transmits second information about the communication rates selected by the selection unit 22, which will be described later, to the wireless LAN terminal 10.

The selection unit 22 selects, from among the plurality of communication rates that can be set in communication with the wireless LAN terminal 10, communication rates used in the communication based on the first information. When the first information indicates that the wireless LAN terminal 10 is a fixed station, the selection unit 22 selects communication rates including the highest communication rate (the maximum transmission rate) and the lowest communication rate (the minimum communication rate) from among the plurality of communication rates that can be set in communication with the wireless LAN terminal 10. That is, the selection unit 22 selects some of the communication rates from among the plurality of communication rates that can be set in communication with the wireless LAN terminal 10.

As described above, the wireless LAN terminal 10 transmits, to the access point 20, the first information about whether or not the wireless LAN terminal 10 is a fixed station. When the wireless LAN terminal 10 is a fixed station, the access point 20 does not select all of the communication rates that can be set in communication, but selects only some of the communication rates including the maximum communication rate and the minimum communication rate.

It should be noted that in radio communication, the lower the communication rate, the easier it is to establish the communication. As described above, the access point 20 selects some of the communication rates for the wireless LAN terminal 10, which is a fixed station, instead of selecting all of the communication rates that can be set in communication. Therefore, the wireless LAN terminal 10 and the access point 20 are more likely to perform communication using a lower communication rate in this case where some of the communication rates have been selected than in the case where all of the communication rates that can be set in the communication have been selected. This makes it easier to establish the communication. The fact that it becomes easy to establish communication means that a communication retry is less likely to occur; that is, it is possible to prevent the occurrence of roaming. Therefore, by the communication system 1 according to the first example embodiment, it is possible to prevent the wireless LAN terminal that is fixedly installed from performing roaming.

Second Example Embodiment

Next, a second example embodiment will be described. The second example embodiment is an example embodiment in which the first example embodiment is described in more detail.

Configuration Example of Communication System

Figure 2:
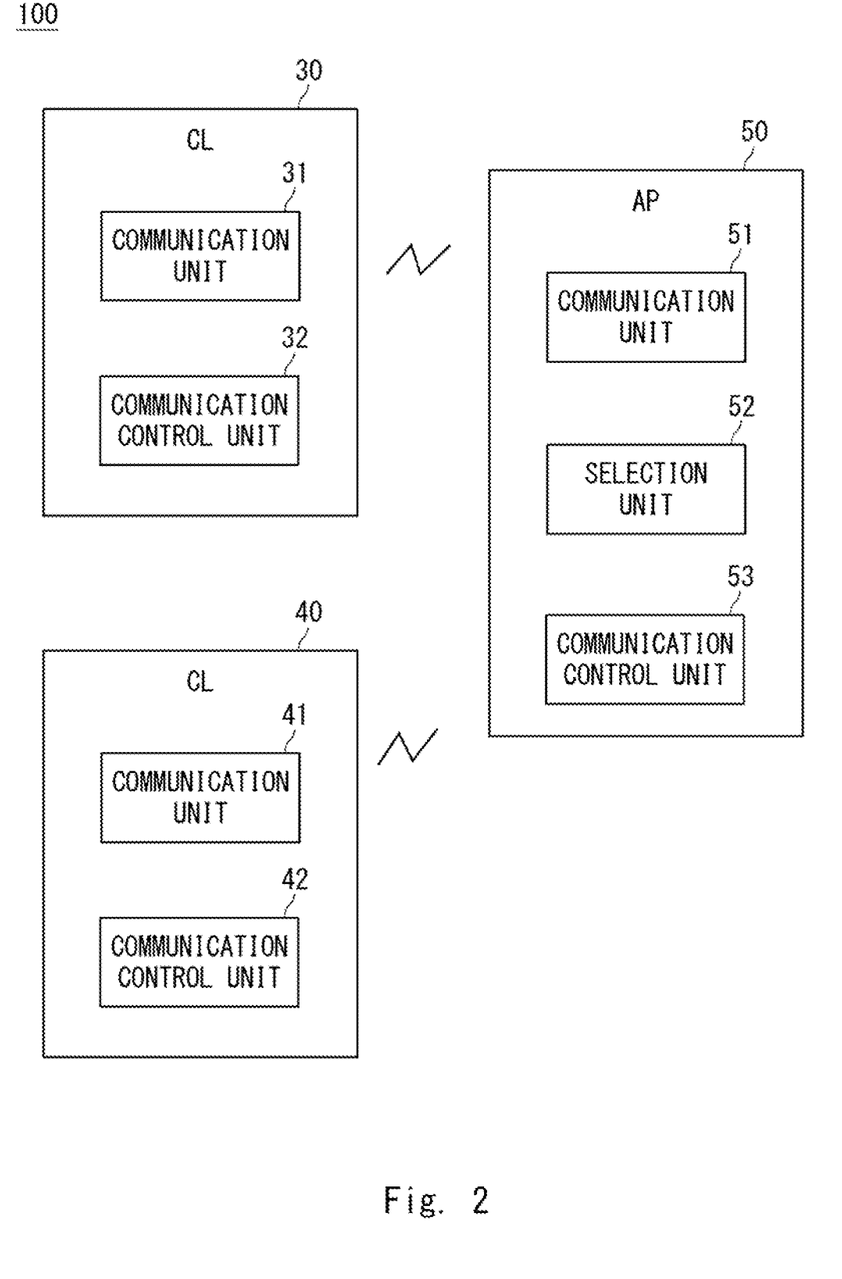
FIG. 2 is a diagram showing a configuration example of a communication system according to a second example embodiment.

A configuration example of a communication system 100 according to the second example embodiment will be described with reference to FIG. 2. FIG. 2 is a diagram showing the configuration example of the communication system according to the second example embodiment.

The communication system 100 is a wireless LAN communication system as in the case of the first example embodiment. The communication system 100 includes a CL 30, a CL 40, and an AP 50. Note that the communication system 100 includes two wireless LAN terminals of the CL 30 and the CL 40, but the communication system 100 may include only one or more wireless LAN terminals.

Each of the CL 30 and CL 40 is a wireless LAN terminal corresponding to the wireless LAN terminal 10 according to the first example embodiment. The CL 30 and the CL 40 are clients that perform processing for connecting to the AP 50 and perform radio communication with the AP 50. The CL 30 and the CL 40 may be referred to as wireless slave stations using the AP 50 as a wireless master unit. The CL 30 and CL 40 may be, for example, mobile phone terminals, smartphone terminals, tablet terminals, personal computer devices, wireless routers, or the like.

The CL 30 and the CL 40 are wireless LAN terminals that support, among the wireless LAN standards, IEEE (Institute of Electrical and Electronics Engineers) 802.11a that uses a frequency band of 5 GHz. The CL 30 and the CL 40 support communication rates of 6 Mbps, 9 Mbps, 12 Mbps, 18 Mbps, 24 Mbps, 36 Mbps, 48 Mbps, and 54 Mbps, which are supported by the above wireless LAN standard.

Note that, as a matter of course, the above wireless LAN standard and above the communication rates supported by the CL 30 and the CL 40 are merely examples. Therefore, the CL 30 and the CL 40 may support IEEE 802.11g, and/or IEEE 802.11n that supports communication rates up to 600 Mbps. Alternatively, the CL 30 and CL 40 may support IEEE 802.11ac that supports a communication rate of 6930 Mbps, and/or IEEE 802.11ax.

The CL 30 is a wireless LAN terminal operated as a fixed station that is installed in a fixed manner. The CL 40 is a wireless LAN terminal operated as a mobile station that is moved and used or a mobile station that will be moved and used. It is only required that the CL 30 and the CL 40 be wireless LAN terminals having a function unit described later, and therefore they may be wireless LAN terminals having the same configuration or wireless LAN terminals having different configurations. Note that, in order to simplify the explanation, it is assumed in the following description that the CL 30 and the CL 40 are wireless LAN terminals having the same configuration.

The AP 50 corresponds to the access point 20 according to the first example embodiment. The AP 50 is a wireless master unit using the CL 30 and the CL 40 as wireless slave stations. The AP 50 may be, for example, a wireless base station apparatus, a wireless communication apparatus including a wireless router, and a wireless relay apparatus. Among the wireless LAN standards, the AP 50 supports IEEE 802.11a that uses a frequency band of 5 GHz. The AP 50 supports communication rates of 6 Mbps, 9 Mbps, 12 Mbps, 18 Mbps, 24 Mbps, 36 Mbps, 48 Mbps, and 54 Mbps, which are supported by the above wireless LAN standard.

Note that, as a matter of course, the above wireless LAN standard and the above communication rates supported by the AP 50 are merely examples. It is only required that the AP 50 support the wireless LAN standard and the communication rates supported by the CL 30 and the CL 40. Therefore, the AP 50 may support IEEE 802.11g or IEEE 802.11n. Alternatively, the AP 50 may support IEEE 802.11ac or IEEE 802.11ax.

Configuration Example of CL (Client)

Next, configuration examples of the CL 30 and the CL 40 will be described. As described above, since the CL 30 and the CL 40 are wireless LAN terminals having the same configuration, the configuration example of the CL 30 will be described first. After that, the configuration example of the CL 40 will be described, and the descriptions of the same configuration as that of the CL 30 will be omitted as appropriate.

The configuration example of the CL 30 will be described. The CL 30 includes a communication unit 31 and a communication control unit 32.

The communication unit 31 corresponds to the communication unit 11 according to the first example embodiment. When the CL 30 connects (belongs) to the AP 50, the communication unit 31 includes fixed station/mobile station information indicating whether or not the CL 30 is a fixed station or a mobile station in a Probe request message and transmits this message to the AP 50. Since the CL 30 is a fixed station, the communication unit 31 transmits, to the AP 50, a Probe request message including fixed station/mobile station information in which a "fixed station" is set.

Further, when the CL 30 connects (belongs) to the AP 50, the communication unit 31 receives an Association response message including used communication rate information. The communication unit 31 acquires the used communication rate information from the Association response message. The used communication rate information is information about the communication rates selected by the AP 50 among the communication rates supported by the CL 30 and the AP 50.

The communication control unit 32 corresponds to the communication control unit 12 according to the first example embodiment. Immediately after the connection to the AP 50 is completed and immediately after the communication with the AP 50 is disconnected after it has been established, the communication control unit 32 attempts to communicate with the AP 50 based on the communication rates included in the used communication rate information. Specifically, the communication control unit 32 selects, from among the communication rates included in the used communication rate information, a communication rate in an order starting from the highest one, and attempts to communicate with the AP 50 using the selected communication rate.

For example, it is assumed that a communication rate of 54 Mbps, which is the maximum communication rate, a communication rate of 24 Mbps, which is an intermediate communication rate between the maximum communication rate and the minimum communication rate, and a communication rate of 6 Mbps, which is the minimum communication rate, are set in the used communication rate information. The communication control unit 32 first selects the communication rate of 54 Mbps, and attempts to communicate with the AP 50 using the communication rate of 54 Mbps. When the communication control unit 32 has failed to establish communication with the AP 50 at the communication rate of 54 Mbps, the communication control unit 32 incrementally increases the number of retries, selects the communication rate of 54 Mbps again, and attempts to communicate with the AP 50 using the communication rate of 54 Mbps.

When the communication control unit 32 has failed to establish communication, the communication control unit 32 incrementally increases the number of retries, selects the communication rate of 24 Mbps next, and attempts to communicate with the AP 50 using the communication rate of 24 Mbps. When the communication control unit 32 has failed to establish communication with the AP 50 at the communication rate of 24 Mbps, the communication control unit 32 incrementally increases the number of retries, selects the communication rate of 6 Mbps next, and attempts to communicate with the AP 50 using the communication rate of 6 Mbps. Further, when the number of retries is less than a predetermined number that roaming is performed and the communication control unit 32 cannot perform communication at the minimum communication rate, the communication control unit 32 continues to attempt communication at the minimum communication rate until the number of retries exceeds the aforementioned predetermined number or communication is established.

As described above, the communication control unit 32 performs a communication retry once only when the communication rate is 54 Mbps, which is the maximum communication rate. Note that when communication with the AP 50 is not established using the intermediate communication rate, the communication control unit 32 may perform a communication retry using the intermediate communication rate.

Next, the configuration example of the CL 40 will be described. The CL 40 includes a communication unit 41 and a communication control unit 42. The communication unit 41 has the same configuration as that of the communication unit 31, the communication control unit 42 has the same configuration as that of the communication control unit 32, and thus redundant descriptions thereof will be omitted. The difference between the CL 30 and the CL 40 is that one of them is a fixed station while the other one is a mobile station.

Therefore, the following description of the configuration of the CL 40 will be given in accordance with the assumption that the wireless LAN terminal is a mobile station.

Since the CL 40 is a mobile station, the communication unit 41 transmits, to the AP 50, a Probe request message including fixed station/mobile station information in which a "mobile station" is set.

Immediately after the connection to the AP 50 is completed and immediately after the communication with the AP 50 is disconnected after it has been established, the communication control unit 42 selects, from among the communication rates included in the used communication rate information, a communication rate in an order starting from the highest one, and attempts to communicate with the AP 50 using the selected communication rate. When the communication control unit 42 has failed to perform communication, it performs a retry once for each communication rate.

Configuration Example of AP (Access Point)

Next, a configuration example of the AP 50 will be described. The AP 50 includes a communication unit 51, a selection unit 52, and a communication control unit 53.

The communication unit 51 corresponds to the communication unit 21 according to the first example embodiment. When the CL 30 and the CL 40 connect (belong) to the AP 50, the communication unit 51 receives a Probe request message including fixed station/mobile station information. The communication unit 51 acquires the fixed station/mobile station information from the Probe request message.

Further, the communication unit 51 sets information about the communication rates selected by the selection unit 52, which will be described later, in used communication rate information, and transmits an Association response message including the used communication rate information to the CL 30 and the CL 40.

The selection unit 52 corresponds to the selection unit 22 according to the first example embodiment. The selection unit 52 selects, based on the fixed station/mobile station information acquired by the communication unit 51, communication rates used to communicate with the CL 30 and the CL 40 from among a plurality of communication rates that can be set in the communication with the CL 30 and the CL 40. Specifically, the selection unit 52 selects communication rates used for communication from among the communication rates supported by the CL 30, the CL 40 and the AP 50 based on the fixed station/mobile station information acquired by the communication unit 51.

When the fixed station/mobile station information indicates a "mobile station", the selection unit 52 selects all of the communication rates supported by the CL 40 and the AP 50.

When the fixed station/mobile station information indicates a "fixed station", the selection unit 52 selects a communication rate of 54 Mbps, which is the maximum communication rate, a communication rate of 24 Mbps, which is the intermediate communication rate, and a communication rate of 6 Mbps, which is the minimum communication rate, from among the communication rates supported by the CL 30 and the AP 50.

Note that in this example embodiment, although the selection unit 52 selects only one intermediate communication rate, it may instead select a plurality of intermediate communication rates, the number of which being five or less, or may instead select a communication rate other than 24 Mbps as the intermediate communication rate. Alternatively, the selection unit 52 may select two communication rates, which are the maximum communication rate and the minimum communication rate, without selecting the intermediate communication rate.

The communication control unit 53 is a control unit that controls communication with the CL 30 and the CL 40. The communication control unit 53 manages the used communication rates transmitted to the CL 30 and the CL 40, and when communication is attempted by the CL 30 and the CL 40, the communication control unit 53 determines the communication rate used by the CL 30 and the CL 40 from among the used communication rates. When the communication control unit 53 can establish communication at the communication rate used by the CL 30 and the CL 40, the communication control unit 53 establishes communication. When communication is attempted by the CL 30 and the CL 40 and the communication control unit 53 has failed to receive some of the transmission data from the CL 30 and the CL 40, the communication control unit 53 transmits at least one of information and a message that indicate that communication cannot be established to the CL 30 and the CL 40.

Operation Example of Communication System

Next, an operation example of the communication system 100 according to the second example embodiment will be described with reference to FIGS. 3 to 6.

Figure 3:
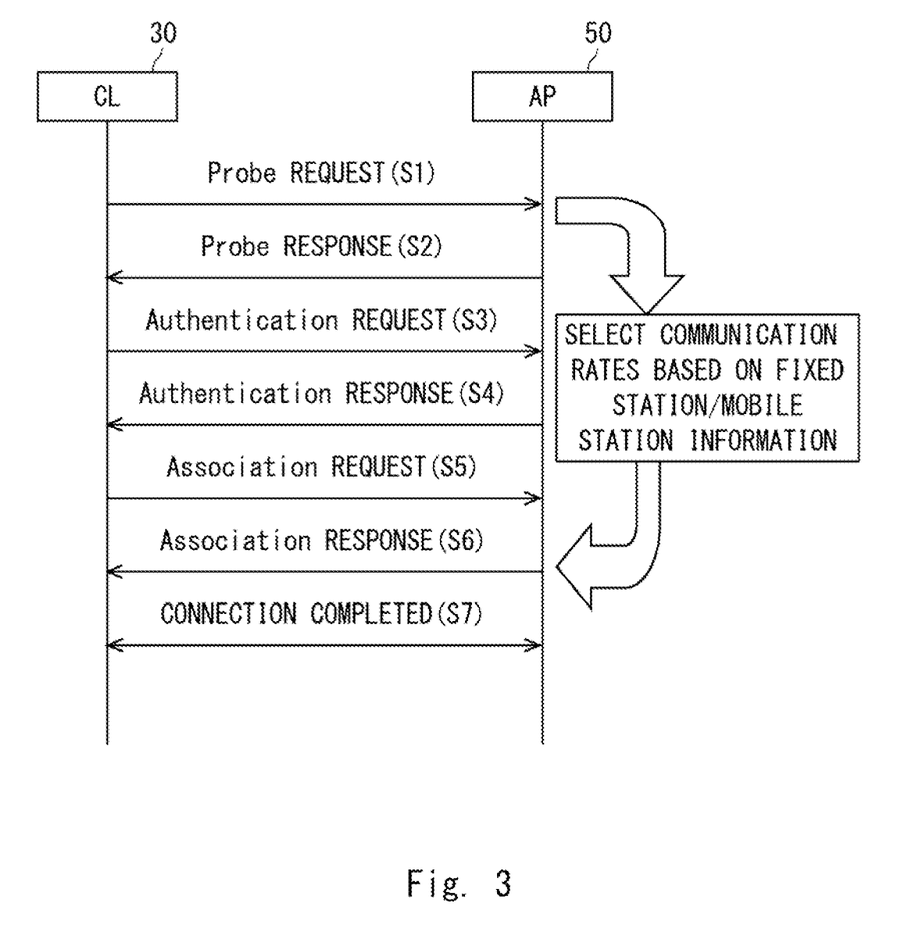
FIG. 3 is a diagram for explaining an operation example when a CL connects to an AP.

First, FIG. 3 will be described. FIG. 3 is a diagram for explaining an operation example when the CL connects to the AP. Note that since the CL 30 and the CL 40 basically perform the same operation, a description will be given using the CL 30, and when the operation of the CL 40 is different from that of the CL 30, the operation of the CL 40 will also be described.

First, the communication unit 31 of the CL 30 transmits a Probe request message to the communication unit 51 of the AP 50 in order to connect to the AP 50 (Step S1). The communication unit 31 transmits the Probe request message to ask the AP 50 as to whether or not the SSID (Service Set Identifier) is an SSID for requesting connection. Further, the communication unit 31 sets information about whether the CL 30 is a fixed station or a mobile station in fixed station/mobile station information, includes the fixed station/mobile station information in the Probe request message, and transmits this message to the communication unit 51. When the communication unit 51 receives the Probe request message, it acquires the fixed station/mobile station information.

When the CL 30 connects to the AP 50, the communication unit 31 sets a "fixed station" in the fixed station/mobile station information, includes this information in the Probe request message, and transmits this message to the AP 50. Meanwhile, when the CL 40 connects to the AP 50, the communication unit 41 sets s "mobile station" in the fixed station/mobile station information, includes this information in the Probe request message, and transmits this message to the communication unit 51 of the AP 50.

Next, when the SSID included in the Probe request message matches the SSID of the AP 50, the communication unit 51 of the AP 50 transmits a Probe response message to the communication unit 31 of the CL 30 (Step S2).

Next, in order to exchange authentication information between the CL 30 and the AP 50, the communication unit 31 transmits an Authentication request message to the communication unit 51 (Step S3), and the communication unit 51 transmits an Authentication response message to the communication unit 31 (Step S4).

Next, the communication unit 31 transmits, to the communication unit 51, an Association request message as a connection request to the communication unit 51 (Step S5).

Here, the selection unit 52 selects communication rates used to communicate with the CL 30 based on the fixed station/mobile station information included in the Probe request message, and notifies the communication unit 51 about the selected communication rates. Then, the communication unit 51 sets the information about the communication rates which the selection unit 52 has sent a notification about in used communication rate information, includes this information in an Association response message, and transmits this message to the communication unit 31 (Step S6). Note that, in the exchange of the Association request and the Association response thereto, the CL 30 and the AP 50 exchange security settings to be used such as encryption in connection.

Finally, when the operations from Step S1 to Step S6 are successfully performed, the connection between the communication unit 31 and the communication unit 51 is completed (Step S7).

Figure 4:
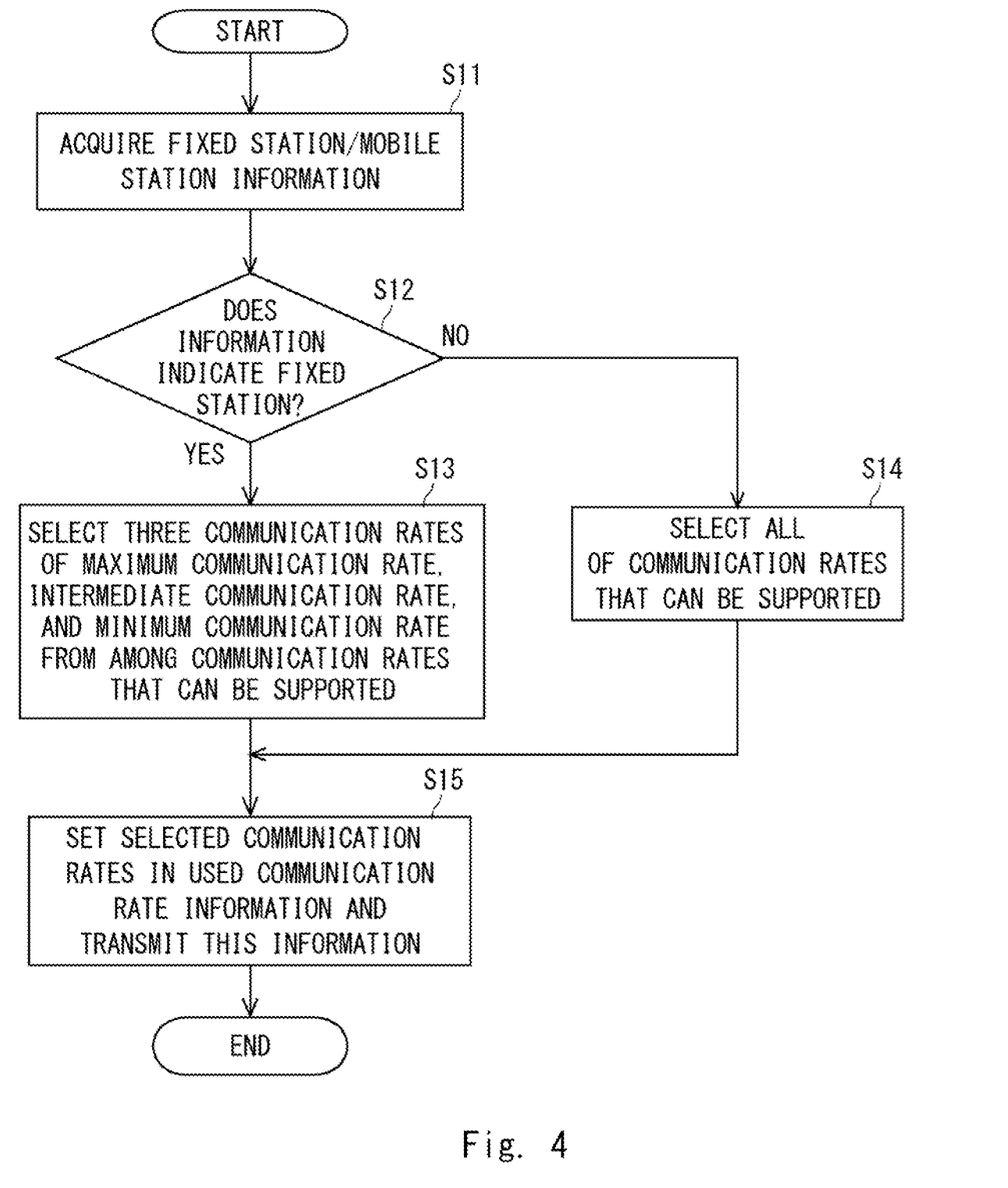
FIG. 4 is a diagram for explaining an operation example of the AP according to the second example embodiment.

Next, an operation example of the AP 50 will be described with reference to FIG. 4. FIG. 4 is a diagram for explaining an operation example of the AP according to the second example embodiment. Specifically, FIG. 4 shows an example of an operation performed from when the communication unit 51 receives a Probe request message until it transmits an Association response message to the CL 30 or the CL 40.

First, when the communication unit 51 receives a Probe request message, it acquires fixed station/mobile station information from the Probe request message (Step S11). The communication unit 51 transmits the acquired fixed station/mobile station information to the selection unit 52.

Next, the selection unit 52 determines whether or not the acquired fixed station/mobile station information indicates a fixed station (Step S12).

If the acquired fixed station/mobile station information indicates a fixed station (YES in Step S12), the process proceeds to Step S13.

In Step S13, if the acquired fixed station/mobile station information indicates a fixed station, the selection unit 52 selects three communication rates, which are the maximum communication rate, the intermediate communication rate, and the minimum communication rate, from among the communication rates that can be supported by the CL 30 and the AP 50 (Step S13). The selection unit 52 selects a communication rate of 54 Mbps as the maximum communication rate, a communication rate of 24 Mbps as the intermediate communication rate, and a communication rate of 6 Mbps as the minimum communication rate. The selection unit 52 transmits the selected communication rates to the communication unit 51.

Meanwhile, if the acquired fixed station/mobile station information indicates a mobile station (NO in Step S12), the process proceeds to Step S14.

In Step S14, if the acquired fixed station/mobile station information indicates a mobile station, the selection unit 52 selects all of the communication rates that can be supported by the CL 30 and the AP 50 (Step S14).

Next, the communication unit 51 sets the communication rates selected by the selection unit 52 in used communication rate information, includes this information in an Association response message, and transmits this message to the communication unit 31 (Step S15). Then, the communication control unit 32 attempts to communicate with the communication unit 51 based on the used communication rate information. In other words, the CL 30 and the AP 50 operate so that they perform communication only at the communication rates included in the used communication rate information.

Figure 5:
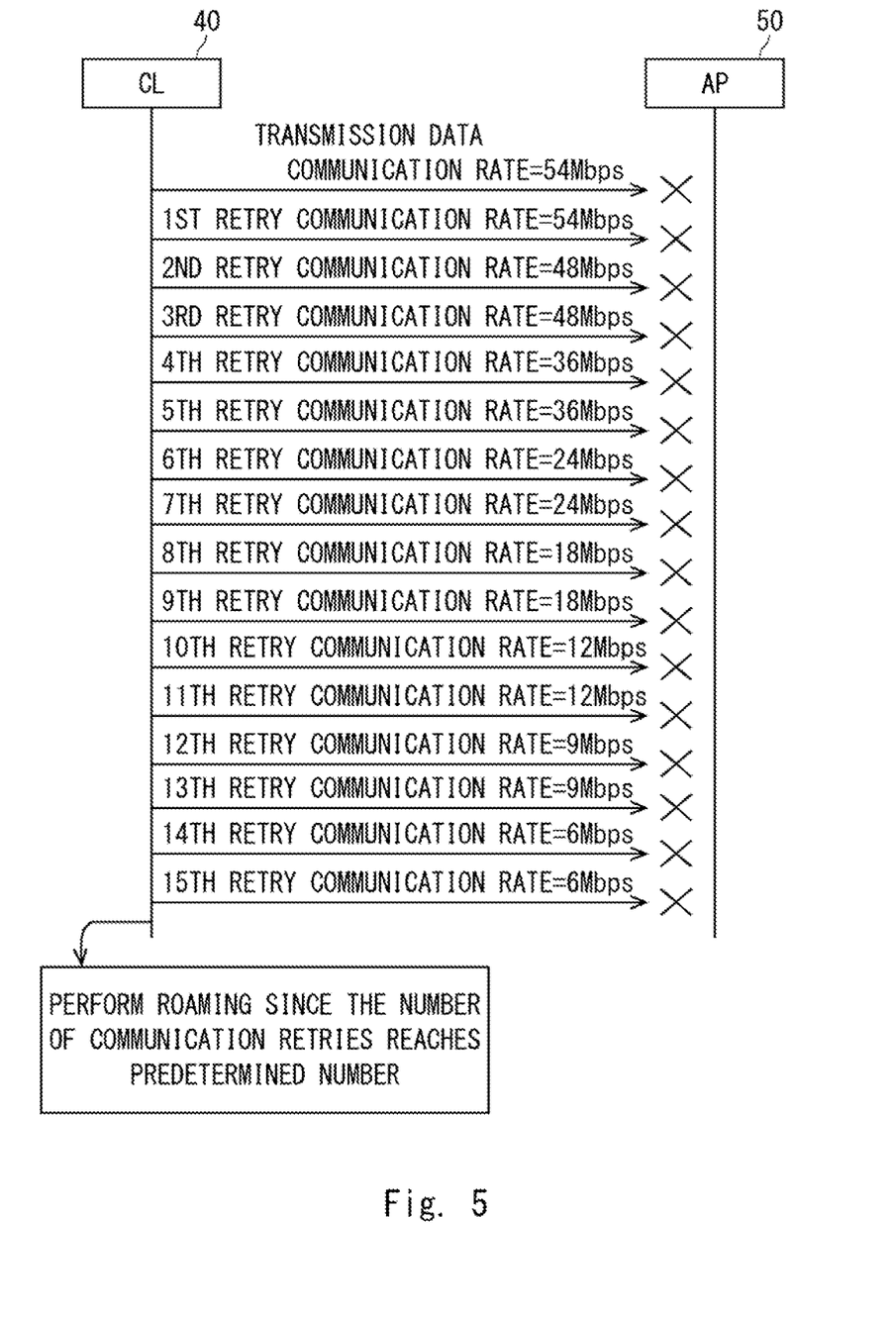
FIG. 5 is a diagram for explaining an operation example of the communication system according to the second example embodiment.

Next, an operation example when a retry of communication between the CL 40 and the AP 50 is performed will be described with reference to FIG. 5. Since the CL 40 is a mobile station, FIG. 5 shows a diagram for explaining an operation example of the wireless LAN terminal, which is a mobile station, and the AP 50. The operation shown in FIG. 5 is performed immediately after the CL 40 is connected to the AP 50 and again immediately after the CL 40 is disconnected from the AP 50 after it establishes communication with the AP 50.

First, the communication control unit 42 transmits to the CL 40 data using the highest communication rate among the communication rates included in used communication rate information. The communication rates included in the used communication rate information transmitted to the CL 40 are all the communication rates that can be supported by the CL 40 and the AP 50. Therefore, the communication control unit 42 attempts to communicate with the AP 50 using the communication rate of 54 Mbps, which is the maximum communication rate.

When the communication control unit 42 attempts to communicate with the AP 50 using the communication rate of 54 Mbps, which is the maximum communication rate, and finds that communication cannot be established, the communication control unit 42 attempts to communicate with the AP 50, as a first retry, again using the communication rate of 54 Mbps, which is the maximum communication rate.

When the communication attempt of the first retry fails, the communication control unit 42 attempts to communicate with the AP 50 using the highest communication rate among the communication rates that are included in the used communication rate information and that are not used. That is, the communication control unit 42 attempts to communicate with the AP 50 using a communication rate of 48 Mbps, which is the next highest communication rate after the maximum communication rate.

When the communication attempt of a second retry fails, the communication control unit 42 attempts to communicate with the AP 50 again using the communication rate of 48 Mbps. When communication attempt of the third retry fails, the communication control unit 42 attempts to communicate with the AP 50 using the highest communication rate among the communication rates that are included in the used communication rate information and that are not used. That is, the communication control unit 42 attempts to communicate with the AP 50 using a communication rate of 36 Mbps, which is the next highest communication rate.

After that, the communication control unit 42 selects communication rates from among the communication rates included in the used communication rate information one after another so that the communication rates selected become gradually lower, and each time a communication attempt using a selected communication rate fails, the communication control unit 42 repeats performing one retry. Then, when the number of communication retries reaches a predetermined number, such as a threshold for performing roaming, the communication control unit 42 performs roaming from the AP 50 to another AP. Note that in FIG. 5, it is assumed that the predetermined number is 15.

Figure 6:
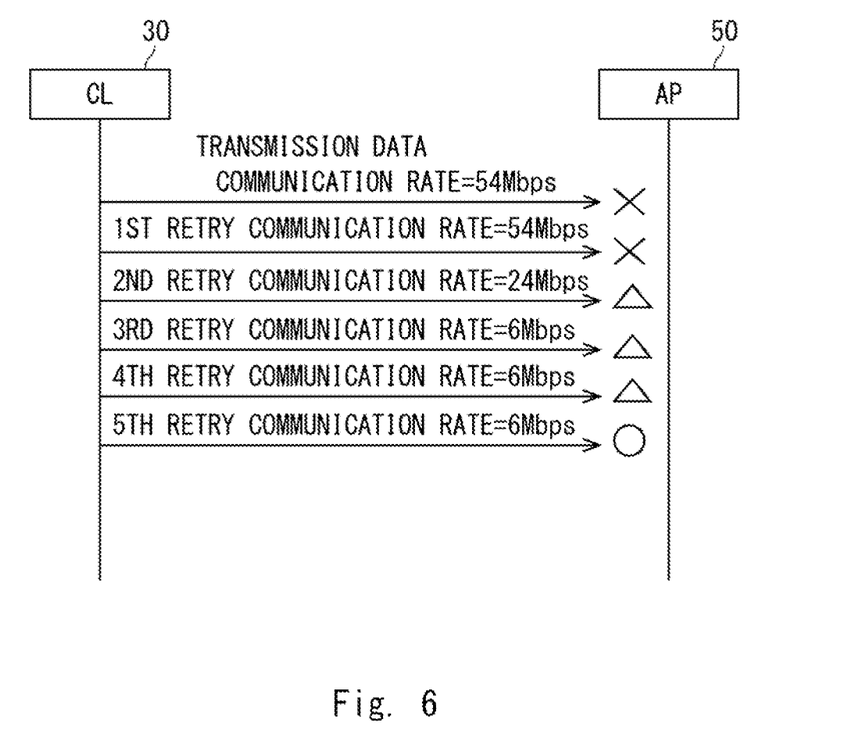
FIG. 6 is a diagram for explaining an operation example of the communication system according to the second example embodiment.

Next, an operation example when a retry of communication between the CL 30 and the AP 50 is performed will be described with reference to FIG. 6. Since the CL 30 is a fixed station, FIG. 6 shows a diagram for explaining an operation example of the wireless LAN terminal, which is a fixed station, and the AP 50. The operation shown in FIG. 6 is performed immediately after the CL 30 is connected to the AP 50 and again immediately after the CL 30 is disconnected from the AP 50 after it establishes communication with the AP 50. Note that in FIG. 6, like in FIG. 5, it is assumed that the predetermined number of retries that roaming is performed is 15.

First, the communication control unit 32 transmits data using the highest communication rate among the communication rates included in the used communication rate information. The communication rates included in the used communication rate information transmitted to the CL 30 are a communication rate of 54 Mbps, which is the maximum communication rate, a communication rate of 24 Mbps, which is the intermediate communication rate, and a communication rate of 6 Mbps, which is the minimum communication rate. Therefore, the communication control unit 32 attempts to communicate with the AP 50 using the communication rate of 54 Mbps, which is the maximum communication rate.

When the communication control unit 32 attempts to communicate with the AP 50 using the communication rate of 54 Mbps, which is the maximum communication rate, and finds that communication cannot be established, the communication control unit 32 attempts to communicate with the AP 50, as a first retry, using the communication rate of 54 Mbps, which is the maximum communication rate.

When the communication attempt of the first retry fails, the communication control unit 32 attempts to communicate with the AP 50 using the highest communication rate among the communication rates that are included in the used communication rate information and that are not used. That is, the communication control unit 32 attempts to communicate with the AP 50 using a communication rate of 24 Mbps, which is the next highest communication rate after the maximum communication rate.

As indicated by a triangular symbol, it is assumed that, for example, in the communication attempt of a second retry, the AP 50 has failed to receive some of the transmitted data. Then, the communication control unit 53 transmits information or a message indicating that the AP 50 has failed to receive some data to the communication control unit 32. The communication control unit 53 recognizes that communication with the AP 50 cannot be established. The communication control unit 32 then attempts to communicate with the AP 50 using the communication rate of 6 Mbps, which is the minimum communication rate, instead of again performing a communication retry using the communication rate of 24 Mbps. That is, when the communication control unit 32 attempts communication using the intermediate communication rate and then fails, the communication control unit 32 does not perform a retry.

When the communication attempt using the communication rate of 6 Mbps, which is the minimum communication rate, fails and the number of retries is less than the predetermined number that roaming is performed, the communication control unit 32 continues to attempt communication using the minimum communication rate until the number of retries exceeds the predetermined number that roaming is performed or communication with the AP 50 is established. As described above, in radio communication, the lower the communication rate, the easier it is to establish the communication. Therefore, the communication control unit 32 continues to attempt the communication using the minimum communication rate until the number of retries that roaming is performed exceeds the predetermined number. As a result, as indicated by the fifth retry shown in FIG. 6, the CL 30 can establish communication with the AP 50 without the predetermined number of retries being exceeded. That is, by doing the above, the CL 30 can establish communication with the AP 50 before the predetermined number of retries that causes roaming is exceeded.

As described above, the AP 50 selects only the maximum communication rate, the intermediate communication rate, and the minimum communication rate for the CL 30, which is a fixed station, instead of selecting all of the communication rates that can be supported by the CL 30 and AP 50, and transmits them to the CL 30. As described above, in radio communication, the lower the communication rate, the higher the possibility of establishing communication. Therefore, communication between the CL 30 and the AP 50 is established at a faster stage by communicating at a lower rate from the start than by sequentially changing communication rates supported by each other.

Further, when the CL 30 attempts communication using the intermediate communication rate and finds that communication cannot be established, the CL 30 operates so that it continues to attempt communication using the minimum communication rate instead of performing a retry. The fact that it becomes easy to establish communication means that a communication retry is less likely to occur; that is, it is possible to prevent the occurrence of roaming. Therefore, by the communication system 100 according to the second example embodiment, it is possible to prevent the CL 30 that is fixedly installed from performing roaming.

In a fixed station, the state of radio waves may change temporarily, causing communication retries. However, since a fixed station is fixedly installed, the state of radio waves basically rarely change, and thus it is preferable to always connect to the same access point as much as possible. By the communication system 100 according to the second example embodiment, it is possible to prevent the CL 30 that is fixedly installed from performing roaming and maintain the state in which the CL 30 can continue to communicate with the AP 50.

Further, it is preferable to cause the CL 40, which is a mobile station, to perform communication at a high communication rate. Therefore, for the CL 40, which is a mobile station, the AP 50 sets all of the communication rates that can be supported by the CL 40 and AP 50 in used communication rate information, and transmits this information to the CL 40. Thus, the communication system 100 according to the second example embodiment enables the CL 40, which is a mobile station, to perform communication at a high communication rate.

Note that in the above-described example embodiments, when the wireless LAN terminal is a fixed station, the wireless LAN terminal transmits fixed station/mobile station information in which a "fixed station" is set to the access point, and when the wireless LAN terminal is a mobile station, the wireless LAN terminal transmits fixed station/mobile station information in which a "mobile station" is set to the access point. In the above-described example embodiments, the wireless LAN terminal may transmit information indicating that the wireless LAN terminal is a "fixed station" to the access point only when it is a fixed station, and may not transmit information indicating that the wireless LAN terminal is a "mobile station" to the access point when it is a mobile station. In this case, when the AP 50 receives information indicating that the wireless LAN terminal is a "fixed station" from the wireless LAN terminal, it determines the wireless LAN terminal to be a "fixed station", and when it does not receive information indicating that the wireless LAN terminal is a "fixed station", it determines the wireless LAN terminal to be a "mobile station".

Other Example Embodiments

Figure 7:
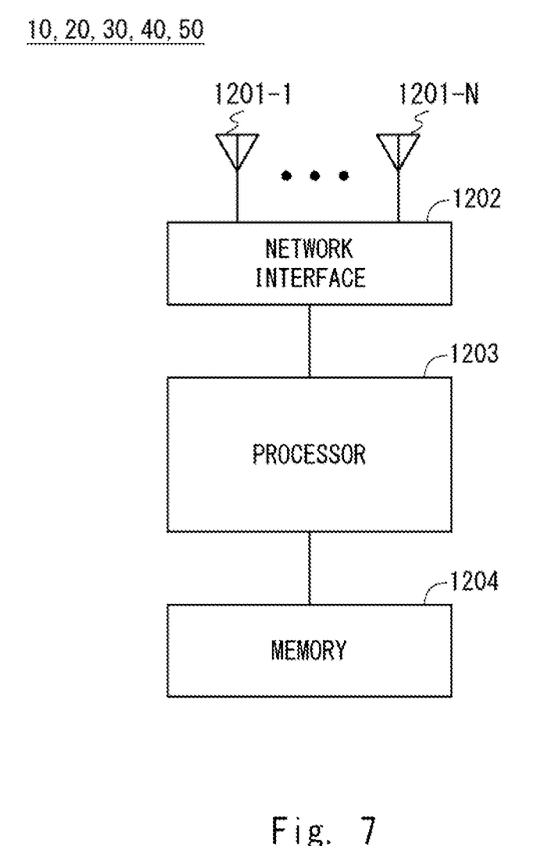
FIG. 7 is a block diagram illustrating a hardware configuration of a wireless LAN terminal and the like according to each of the example embodiments of the present disclosure.

The wireless LAN terminal 10, the access point 20, the CL 30, the CL 40, and the AP 50 (hereinafter collectively referred to as the wireless LAN terminal 10 and the like) described in the above-described example embodiments may have the following hardware configuration. FIG. 7 is a block diagram illustrating the hardware configuration of a computer (an information processing apparatus) capable of implementing the wireless LAN terminal and the like according to each of the example embodiments of the present disclosure.

Referring to FIG. 7, the wireless LAN terminal 10 and the like include a plurality of antennas 1201-1 to 1201-N, a network interface 1202, a processor 1203, and a memory 1204. The plurality of antennas 1201-1 to 1201-N and the network interface 1202 are used to communicate with other wireless communication apparatuses, including a communication terminal 60. The network interface 1202 may include, for example, a network interface card (NIC) conforming to the IEEE 802.11 series, IEEE 802.3 series, and so on.

The processor 1203 loads software (a computer program) from the memory 1204 and executes the loaded software, thereby performing the processing of the wireless LAN terminal 10 and the like described with reference to the flowchart in the above-described example embodiments. The processor 1203 may be, for example, a microprocessor, a Micro Processing Unit (MPU), or a Central Processing Unit (CPU). The processor 1203 may include a plurality of processors.

The memory 1204 is composed of a combination of a volatile memory and a non-volatile memory. The memory 1204 may include a storage located apart from the processor 1203. In this case, the processor 1203 may access the memory 1204 via an I/O interface (not shown).

In the example shown in FIG. 7, the memory 1204 is used to store software modules. The processor 1203 loads these software modules from the memory 1204 and execute the loaded software modules and can thereby perform the processing of the wireless LAN terminal 10 and the like described in the above-described example embodiments.

As described with reference to FIG. 7, each of the processors included in the wireless LAN terminal 10 and the like executes one or a plurality of programs including instructions to cause a computer to perform an algorithm described with reference to the drawings.

In the above-described examples, the program(s) can be stored and provided to a computer using any type of non-transitory computer readable media. Non-transitory computer readable media include any type of tangible storage media. Examples of non-transitory computer readable media include magnetic storage media (e.g., flexible disks, magnetic tapes, and hard disk drives), optical magnetic storage media (e.g., magneto-optical disks). Further, examples of non-transitory computer readable media include CD-ROM (Read Only Memory), CD-R, and CD-R/W. Further, examples of non-transitory computer readable media include semiconductor memories. The semiconductor memories include, for example, mask ROM, PROM (Programmable ROM), EPROM (Erasable PROM), flash ROM, RAM (Random Access Memory), etc. Further, the program (s) may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described example embodiments and may be modified as appropriate without departing from the spirit of the present disclosure. Further, the present disclosure may be implemented by combining the example embodiments as appropriate.

Further, the whole or part of the example embodiments disclosed above can be described as, but not limited to, the following supplementary notes.

Supplementary Note 1

A communication system comprising:
a wireless LAN terminal configured to transmit first information indicating whether or not the wireless LAN terminal is a fixed station that is fixedly installed; and
an access point configured to select, when the first information indicates that the wireless LAN terminal is the fixed station, communication rates including a maximum communication rate and a minimum communication rate from among a plurality of communication rates that can be set in communication with the wireless LAN terminal and transmit second information about the selected communication rates to the wireless LAN terminal,
wherein the wireless LAN terminal attempts communication based on the communication rates included in the second information.

Supplementary Note 2

The communication system according to Supplementary note 1, wherein the access point selects an intermediate communication rate indicating a communication rate between the maximum communication rate and the minimum communication rate.

Supplementary Note 3

The communication system according to Supplementary note 2, wherein the access point selects a plurality of the intermediate communication rates.

Supplementary Note 4

The communication system according to any one of Supplementary notes 1 to 3, wherein
when the wireless LAN terminal cannot perform communication at a first communication rate among the communication rates included in the second information, the wireless LAN terminal incrementally increases the number of retries and attempts communication at a second communication rate that is lower than the first communication rate, and
when the number of the retries is less than a predetermined number and the wireless LAN terminal cannot perform communication at the minimum communication rate, the wireless LAN terminal continues to attempt communication at the minimum communication rate until the number of the retries exceeds the predetermined number or the communication is established.

Supplementary Note 5

The communication system according to any one of Supplementary notes 1 to 4, wherein when the first information indicates that the wireless LAN terminal is not the fixed station or when the access point does not receive the first information, the access point transmits, to the wireless LAN terminal, the second information about all of the communication rates that can be set in the communication with the wireless LAN terminal.

Supplementary Note 6

The communication system according to any one of Supplementary notes 1 to 5, wherein
the wireless LAN terminal transmits a Probe request message including the first information to the access point, and
the access point transmits an Association response message including the second information to the wireless LAN terminal.

Supplementary Note 7

An access point comprising:
a communication unit configured to receive, from a wireless LAN terminal, first information indicating whether or not the wireless LAN terminal is a fixed station that is fixedly installed; and
a selection unit configured to select, when the first information indicates that the wireless LAN terminal is the fixed station, communication rates including a maximum communication rate and a minimum communication rate from among a plurality of communication rates that can be set in communication with the wireless LAN terminal,
wherein the communication unit transmits second information about the selected communication rates to the wireless LAN terminal.

Supplementary Note 8

The access point according to Supplementary note 7, wherein the selection unit selects an intermediate communication rate indicating a communication rate between the maximum communication rate and the minimum communication rate.

Supplementary Note 9

The access point according to Supplementary note 8, wherein the selection unit selects a plurality of the intermediate communication rates.

Supplementary Note 10

The access point according to any one of Supplementary notes 7 to 9, wherein when the first information indicates that the wireless LAN terminal is not the fixed station or when the selection unit does not receive the first information, the selection unit selects all of the communication rates that can be set in the communication with the wireless LAN terminal.

Supplementary Note 11

The access point according to any one of Supplementary notes 7 to 10, wherein the communication unit receives a Probe request message including the first information from the wireless LAN terminal, and transmits an Association response message including the second information to the wireless LAN terminal.

Supplementary Note 12

A wireless LAN terminal comprising:
a communication unit configured to transmit, to an access point, first information indicating whether or not the wireless LAN terminal is a fixed station that is fixedly installed and receive, from the access point, second information about communication rates used for communication with the access point; and
a communication control unit configured to attempt communication based on the communication rates included in the second information.

Supplementary Note 13

The wireless LAN terminal according to Supplementary note 12, wherein
when the communication control unit cannot perform communication at a first communication rate among the communication rates included in the second information, the communication control unit incrementally increases the number of retries and attempts communication at a second communication rate that is lower than the first communication rate, and
when the number of the retries is less than a predetermined number and the communication control unit cannot perform communication at a minimum communication rate among the communication rates that can be set by the wireless LAN terminal, the communication control unit continues to attempt communication at the minimum communication rate until the number of the retries exceeds the predetermined number or the communication is established.

Supplementary Note 14

The wireless LAN terminal according to Supplementary note 12 or 13, wherein the communication unit transmits a Probe request message including the first information to the access point, and receives an Association response message including the second information from the access point.

Supplementary Note 15

A communication control method comprising:
receiving, from a wireless LAN terminal, first information indicating whether or not the wireless LAN terminal is a fixed station that is fixedly installed;
selecting, when the first information indicates that the wireless LAN terminal is the fixed station, communication rates including a maximum communication rate and a minimum communication rate from among a plurality of communication rates that can be set in communication with the wireless LAN terminal; and
transmitting second information about the selected communication rates to the wireless LAN terminal.

Supplementary Note 16

A communication control program for causing a computer to:
receive, from a wireless LAN terminal, first information indicating whether or not the wireless LAN terminal is a fixed station that is fixedly installed;
select, when the first information indicates that the wireless LAN terminal is the fixed station, communication rates including a maximum communication rate and a minimum communication rate from among a plurality of communication rates that can be set in communication with the wireless LAN terminal; and
transmit second information about the selected communication rates to the wireless LAN terminal.

This application is based upon and claims the benefit of priority from Japanese Patent Application No. 2018-232473, filed on Dec. 12, 2018, the disclosure of which is incorporated herein in its entirety by reference.

REFERENCE SIGNS LIST

1 COMMUNICATION SYSTEM
10 WIRELESS LAN TERMINAL
11, 21, 31, 41, 51 COMMUNICATION UNIT
12, 32, 42, 53 COMMUNICATION CONTROL UNIT
20 ACCESS POINT
22, 52 SELECTION UNIT
30, 40 CL (CLIENT)
50 AP (ACCESS POINT)

What is claimed is:
1. An access point comprising:
a processor; and
a memory storing instructions executable by the processor to:
receive, from a wireless LAN terminal, first information indicating whether or not the wireless LAN terminal is a fixed station that is fixedly installed;
select, when the first information indicates that the wireless LAN terminal is the fixed station, a sub-plurality of communication rates from among a plurality of communication rates that can be set in communication with the wireless LAN terminal, the sub-plurality of communication rates including a maximum communication rate and a minimum communication rate;
select, when the first information indicates that the wireless LAN terminal is not the fixed station, all of the plurality of communication rates that can be set in communication with the wireless LAN terminal; and
transmit second information about the selected communication rates to the wireless LAN terminal.

2. The access point according to claim 1, wherein the sub-plurality of communication rates that are selected includes an intermediate communication rate indicating a communication rate between the maximum communication rate and the minimum communication rate.

3. The access point according to claim 2, wherein the sub-plurality of communication rates includes more than one intermediate communication rate.

4. The access point according to claim 1, wherein the instructions are executable by the processor to further, when the first information is not received, select all of the plurality of communication rates that can be set in the communication with the wireless LAN terminal.

5. The access point according to claim 1, wherein the instructions are executable by the processor to further:
receive a Probe request message including the first information from the wireless LAN terminal; and transmit an Association response message including the second information to the wireless LAN terminal.

6. A communication control method comprising:
receiving, from a wireless LAN terminal, first information indicating whether or not the wireless LAN terminal is a fixed station that is fixedly installed;
selecting, when the first information indicates that the wireless LAN terminal is the fixed station, a sub-plurality of communication rates from among a plurality of communication rates that can be set in communication with the wireless LAN terminal, the sub-plurality of communication rates including a maximum communication rate and a minimum communication rate;
selecting, when the first information indicates that the wireless LAN terminal is not the fixed station, all of the plurality of communication rates that can be set in communication with the wireless LAN terminal; and
transmitting second information about the selected communication rates to the wireless LAN terminal.

7. A non-transitory computer readable medium storing a communication control program for causing a computer to execute the communication control method according to claim 6.

* * * * *